United States Patent
Scholer et al.

(10) Patent No.: US 7,648,603 B2
(45) Date of Patent: Jan. 19, 2010

(54) COLORLESS PRIMER COMPOSITION AND METHOD

(75) Inventors: Fred Richard Scholer, East Windsor, NJ (US); Hsing-Hui Yu, Kearny, NJ (US); Wayne A. Merrifield, Hamburg, NJ (US)

(73) Assignee: Hercules Chemical Company Incorporated, Passaic, NJ (US)

( * ) Notice: Subject to any disclaimer, the term of this patent is extended or adjusted under 35 U.S.C. 154(b) by 533 days.

(21) Appl. No.: 11/498,636

(22) Filed: Aug. 2, 2006

(65) Prior Publication Data

US 2008/0029213 A1  Feb. 7, 2008

(51) Int. Cl.
*C09K 11/02* (2006.01)
*B65H 69/02* (2006.01)
*F16J 15/02* (2006.01)
*C09K 11/06* (2006.01)
*C09K 11/77* (2006.01)

(52) U.S. Cl. ............... 156/67; 156/157; 156/158; 277/602; 277/608; 277/627; 252/301.21; 252/301.4 R

(58) Field of Classification Search ............... 156/67, 156/157, 158, 71; 277/602, 608, 627; 252/301.21, 252/301.4 R, 301.5, 301.6 R, 301.6 S, 301.6 P, 252/301.6 F, 301.4 S, 301.4 P, 301.4 F, 301.4 H
See application file for complete search history.

(56) References Cited

U.S. PATENT DOCUMENTS

| | | | |
|---|---|---|---|
| 4,860,796 A | | 8/1989 | Hagin |
| 4,979,993 A | * | 12/1990 | Okamoto et al. ......... 106/287.3 |
| 5,416,142 A | * | 5/1995 | Bush et al. .................. 524/113 |
| 5,539,013 A | | 7/1996 | Eckberg et al. |
| 5,596,025 A | | 1/1997 | Oxman et al. |
| 6,372,821 B1 | | 4/2002 | Patel et al. |
| 7,005,166 B2 | * | 2/2006 | Narita et al. ............. 428/32.76 |
| 2003/0035917 A1 | | 2/2003 | Hyman |

OTHER PUBLICATIONS

International Search Report from the International Bureau for International Patent Application No. PCT/US2007/074953 dated Jul. 25, 2008.

* cited by examiner

*Primary Examiner*—Philip C Tucker
*Assistant Examiner*—Sing P Chan
(74) *Attorney, Agent, or Firm*—Stroock & Stroock & Lavan LLP

(57) ABSTRACT

A primer formulated with a colorless dye detectable only under black light is provided. The present invention is non-detectable on a porous surface and color does not appear over time upon exposure to natural or synthetic lights. Under black light, sometimes referred to as ultra violet energy or long wave black light, the colorless dye appears as purple. However, once the black light is removed, the primer ceases to glow and returns to its natural, colorless state.

14 Claims, No Drawings

COLORLESS PRIMER COMPOSITION AND METHOD

BACKGROUND OF THE INVENTION

The invention relates generally to a primer composition and, in particular, to a colorless primer composition that can be used to provide a permanent, detectable primer to be used in the construction industry for identifying proper conditioning of a plastic pipe, which will not cause visible stain.

Purple primer is a well-known product used in the plumbing and construction industry. It is used to properly condition a plastic pipe, such as PVC (polyvinyl chloride) or CPVC (chlorinated PVC), prior to jointing two separate pipes by a cemented joint.

According to American Society for Testing and Materials ("ASTM") standards D2564, D2235, D3138 and F493, PVC or CPVC plastic pipes must be cleaned and conditioned prior to joining them with a plastic pipe cement bond. Purple primer plays an important role in this process, in that it softens or tackifies the surface of the plastic pipe, allowing a more effective fusing of the two pipes through the formation of the cement bond. The ASTM standards call for the use of a solvent primer, which can effectively remove surface dirt grease and grime and soften the surface of a plastic pipe in order that the application of a plastic pipe cement will form a permanent, air tight and water tight bond. Traditional primer typically includes solvents, such as tetrahydrofuran, methyl ethyl ketone, acetone, cyclohexanone of N-methyl pyrrilidone, in which PVC or CPVC resin is dissolved along with fillers, stabilizers and colorants.

Traditional primers are based on clear, colorless solvents such as acetone or methyl ethyl ketone (MEK) and a colored, permanent dye, typically purple in color. The colored dye has no functional purpose other than coloring the pipes to allow an inspector to visually confirm that a primer has been applied before applying cement. Standards within the industry, such as the Uniform Plumbing Code (UPC) and the International Plumbing Code (IPC), require the use of a permanent, purple colored primer in the process of producing a permanent pipe cemented bond. Because inspection at a construction site may occur on a day or time other than when the actually cementing is taking place, the inspector depends on the presence of the purple color on the pipe joints as evidence that a primer has been properly applied.

Traditional purple primers allow for quick visual inspections. The permanent color dye in the primer cannot be removed by cleaning with water or other solvent systems. The coloring cannot be removed by abrading with sand paper or other abrasive medium without severely scarring the applied surfaces. While the permanency of the purple color is necessary, it can also be a troublesome characteristic of traditional purple primers.

Because of the permanent characteristic of the dye, traditional purple primers immediately leave a permanent, purple stain on any porous or plastic surface, such as countertops, vinyl floors, and/or carpets, upon contact. The stain cannot be removed through any normal cleaning method, without destroying the stained surface. This has been a serious problem in construction, home repair or other processes, because the primer often comes in contact with porous or plastic surfaces through unintentional applications or accidental spills, leaving plastic or porous surfaces with an unsightly stain. While stains on pipes can be hidden behind finished walls, other stained surfaces often have to be replaced totally.

Because of this permanent consequence, there is a need for stainless, yet permanent, detectable purple primer.

Accordingly, it is desirable to provide an improved stain free purple primer that overcomes drawbacks and inadequacies of the prior art.

SUMMARY OF THE INVENTION

Generally speaking, in accordance with the invention, a primer formulated with a colorless dye detectable only under black light is provided. The present invention is non-detectable on a porous surface and color does not appear over time upon exposure to natural or synthetic lights. However, under black light, sometimes referred to as ultra violet energy or long wave black light, the colorless dye appears as, e.g., purple. However, once the black light is removed, the primer ceases to glow and returns to its natural, colorless state. This can satisfy a building inspector without causing permanent damage to many surfaces.

Colorless primer in accordance with the invention can be formulated to include selected suitable dyes that fluoresce under black light to produce a purple color consistent with IPC and UPC building codes. Such dyes are preferably soluble in standard solvents used in the primer industry, such as cyclohexanone, THF, acetone or MEK, for purposes of priming plastic pipe. Suitable solvents should not interfere with the primer process as described in ASTM D2564 or F403. Preferred dyes react to black light when black light is applied from a simple black light torch, from a reasonable distance, e.g., less than three feet, to allow an inspector to perform visual inspection.

The selected dye or dyes should be stable for prolonged periods of time in the primer solvent solution and through exposure to either light or air. When applied to a porous surface, such as vinyl or stone, the selected dyes should not produce a discoloration over time when exposed to natural, incandescent or fluorescent light. The selected dyes should also be safe to use according to NSF 61 standards for potable water.

DETAILED DESCRIPTION OF THE PREFERRED EMBODIMENTS

The invention is directed to colorless primer compositions and methods of using such compositions with plastic pipes prior to joining the pipes with adhesives. As will be evident to those of ordinary skill in the art, substitutions, omissions and additions will be possible in order to provide adhesives with customized selected properties.

Preferred embodiments of the invention should comprise, but are not limited to, a solvent component and a dye component. Compositions in accordance with the invention can also include a UV light stabilizer component. The inclusion of the UV light stabilizer component is not necessary for the function of the primer.

A solvent component in accordance with preferred embodiments of the invention can include a combination of solvents commonly used in primers in the plumbing and construction trades industry. Preferred solvents can include combinations of 0-80% tetrahydrofuran (THF), 0-80% cyclohexanone (CYH), 0-100% acetone and/or 0-100% methyl ethyl ketone (MEK), preferably 1-20% tetrahydrofuran (THF), 1-20% cyclohexanone (CYH) and 20-50% acetone and 20-50% methyl ethyl ketone (MEK), most preferably 5-15% of tetrahydrofuran (THF), 5-15% of cyclohexanone (CYH) and 35-45% each of acetone and methyl ethyl ketone (MEK). Of these, the most preferred blend is 10% tetrahydrofuran, 10% cyclohexanone, 40% methyl ethyl ketone and 40% acetone.

The dye component can include a single component dye or a multi-component combination dye. Both components should fluoresce under black light to appear as a purple color consistent with IPC and UPC building codes. An example of the dye component is the combination of DFSB-C7 (red), DFSB-C0 (blue) and DFLQ-C2 (yellow), as supplied by Risk Reactor of Huntington Beach, Calif. The single component dyes, such as LX 10522 Pylakrome white or S 5 Pylakor White, supplied by Pylam Products Company, Inc. of Tempe, Ariz., are also examples of dyes suitable for the colorless purple primer. A preferred dye component includes a combination of red dye and blue dye, such as DFSB-C7 and DFSB-C0, each with the total weight in the range of 0.00005-0.02%, preferably between 0.0001-0.1% of the solvent mixture. The ratio between the blue dye and the red dye can range from 4:1 to 1:4. The preferred ratio for the best expression of purple color is about 1:1.

Dyes used in the current invention should not interfere with the primer process as described in ASTM D2564 or F403. They should be safe to use for potable water as according to NSF 61. These dyes should react to black light when black light is applied from a simple black light torch at a reasonable distance (e.g., less than about three feet) to allow an inspector to perform visual inspection. The selected dye or dyes should also have the attribute of being stable for prolonged periods of time in the primer solvent solution, even when exposed to either light or air. When applied to a porous surface, such as vinyl or stone, these dyes should not produce a discoloration over time when exposed to natural, incandescent or fluorescent light. Preferred compositions will remain colorless on surfaces such as PVC for more than six months for testing purposes, preferably more than a year.

An example of the colorless primer composition includes a combination of acetone and MEK with a minimal amount of red dye (DFSB-C7) and blue dye (DFSB-C0), i.e., about a 1:1 ratio, totaling 0.0001% of the solvent mixture.

Colorless primer in accordance with the invention also can advantageously include an UV stabilizer. Although the dyes selected should show no instability in either their storage can or on exposure to air or light, the UV stabilizer can be added as a precaution to ensure stability. The UV light stabilizer component is exemplified by the class of hindered amine light stabilizers (HALS). Examples of preferred UV light stabilizers include a hindered phenol based phosphite such as Irganox 1010, supplied by Ciba Geigy of Hawthorne, N.Y., and/or hindered quinone exemplified by Irgafos 168, also supplied by Ciba Geigy of Hawthorne, N.Y. A preferred UV stabilizer is Irganox 1010 at a weight percent of 0.005-0.2, most preferably 0.01-0.1% of the solvent mixture.

The colorless primer should not require special handling or packaging. It should be able to be supplied in a standard metal container with dauber as currently used in the industry. Daubers and cans are exemplified by the daubers supplied by National Novelty Brush, Lancaster, Pa., and the metal cans by Prime Packaging Group, Kearney, N.J.

The colorless primer can be applied exactly as described by ASTM F656. The incorporation of the fluorescent dye should not change the routine operations of the user as described in ASTM F656. Once applied and dried, the minute levels of fluorescent dye left on the surface of the plastic pipe should respond to black light and exhibit a color under black light. Removal of the black light returns the plastic pipe to a natural, colorless state.

Examples of the black light employed in order to induce fluorescence in the applied primer is Model No. BNBNS flash light, supplied by Risk Reactor of Huntington Beach, Calif., or the pen light model # BL-900 supplied by Fortune Products, Inc., Lake Stevens, Wash. Black light Model No. BNBNS is recommended for its convenience of size and illumination.

Unlike the traditional purple primer employed by the industry, the appearance of the purple color should only be generated by the application of black light. The dye should be selected so that, if the colorless primer containing the fluorescent dye is accidentally applied or spilled to a porous surface other than the plastic pipe, upon evaporation of the solvent, although fluorescent dye remains on the porous surface, it should not respond to a broad range of light typified by natural light, incandescent light or light from fluorescent bulbs. Thus, the affected surfaces should appear without any color under normal lighting conditions.

The resistance to any permanent purple color development has been tested over a period of one year with no appearance of any purple color induced by a presence of light other than from a black light.

The following example is provided for the purpose of illustration only and is not intended to be construed as limiting the scope of the invention.

TABLE 1

EXAMPLE COLORLESS PRIMER COMPOSITION

| Components | % by weight |
| --- | --- |
| Clear red dye DFSB-C7 | 0.0006% |
| Clear blue dye DFSB-C0 | 0.0006% |
| Tetrahydrofuran | 10% |
| Cyclohexanone | 10% |
| Methyl Ethyl Ketone | 40% |
| Acetone | 40% |
| Irganox 1010 | 0.1% |

The stability of the colorless purple primer to a light source other than black light is measured by performing exposure tests utilizing a variety of light sources. CPVC and PVC pipe sections were applied with the colorless primer listed in Table 1. These sections were then exposed to a variety of light sources, including natural light, incandescent light and florescent light to test whether exposure to light, other than black light would result in the appearance of a dye related color. During the tests, primer coated sections are periodically exposed to black light to ensure that the fluorescent dye had not deteriorated and was still visible under black light. As can be seen from Table 2, there was no generation of any color during the one-year testing period. The activity of the fluorescent dye did not deteriorate and was maintained during the one-year study.

TABLE 2

EXPOSURE TEST RESULTS

| Light Source | 1 month | 3 months | 6 months | 12 months |
| --- | --- | --- | --- | --- |
| Natural light | No color | No color | No color | No color |
| Incandescent light | No color | No color | No color | No color |
| Fluorescent light | No color | No color | No color | No color |

To test the stability of the colorless primer to light and water, 500 ml of samples of colorless purple prime composition were placed in two 1 L Erlenmeyer flasks. In the first flask, the colorless primer example was subjected to compression expressed through a gas frit. This was continued for a 24-hour period. In the second flask, 10% by weight of distilled water was added to the flask and the solution was then subjected to exposure to compressed air for 24 hours. After 24 hours, the two example primers from the flasks were applied to PVC coupons, dried and subjected to black light. In both cases, the application of the black light induced fluorescent behavior exhibiting the desired color.

A third test was performed to test the performance of the colorless primer composition against ASTM D-XXXX. Using the primer described in Table 1, a PVC pipe assembly was used for testing under a variety of pressures and fluids contained in the pipe. The pipe assembly included a 2-inch PVC pipe. On one end of the pipe, an end cap was connected and sealed with the colorless purple primer example and regular body regular set PVC pipe cement. The other end of the PVC pipe was connected to a hydraulic pump. The hydraulic pump employed was a Simpson Model No. 70 manufactured by Templeton, Kelly and Co. of Broadview, Ill., which is capable of producing up to 10,000 psi of pressure. A needle valve and gauge was connected between the hydraulic pump and the PVC pipe to control and measure the pressure.

The test was conducted at 80 psi twice, once while the pipe assembly contained air and once when the pipe assembly contained water. The pressure was held for 24 hours. In both cases, the pressure was maintained over the time period tested, demonstrating that the colorless purple primer does not lose the desired characteristics over time.

It will thus be seen that the objects set forth above, among those made apparent from the preceding description, are efficiently attained, and, since certain changes may be made in carrying out the above method and in the compositions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A method of joining PVC or CPVC plumbing pipes, comprising:
    applying a primer composition to plastic plumbing pipe joints made from PVC or CPVC to condition the joints, wherein the primer composition is formulated to comply with the NSF 61 standard for safe drinking water system components and comprises a solvent component comprising a combination of between about 5 to about 15% (w/w) tetrahydrofuran, between about 5 to about 15% (w/w) cyclohexanone, between about 35% to about 45% (w/w) of acetone and between about 35% to about 45% (w/w) methyl ethyl ketone and a colorless dye component that appears colored when illuminated with black light;
    applying adhesives to the pipe joints; and
    joining the pipes with the adhesive at the joints, the primer composition formulated to appear colorless under incandescent and fluorescent light, and appearing colored under black light.

2. The method of claim 1, wherein the presence of the primer composition can be inspected by shining a black light on the joint.

3. The method of claim 1, wherein the primer composition appears purple under black light.

4. The method of claim 1, wherein the applying a primer step conforms with ASTM Standards D2564, D2235, D3138, F493, or F403.

5. The method of claim 1, wherein the dye component comprises red dye.

6. The method of claim 1, wherein the dye component comprises blue dye.

7. The method of claim 1, wherein the dye component comprises white dye.

8. The method of claim 1, wherein the dye component comprises a member selected from the group of red dye, blue dye, yellow dye and white dyes between about 0.0001 to about 0.1% (w/w) of the total composition.

9. The method of claim 1, wherein the dyes comprise red dye and blue dye.

10. The method of claim 1, wherein the dye component comprises a combination of fluorescent red and blue dyes in a ratio of about 1:4 to 4:1.

11. The method of claim 1, wherein the dyes comprise between 0.0001-0.1% by weight of the total composition.

12. The method of claim 1, further comprising an UV light stabilizer.

13. The method of claim 12, wherein the UV light stabilizer comprises hindered phenol based phosphite or hindered quinone.

14. The method of claim 12, wherein the UV light stabilizer comprises 0.01-0.1% by weight of the composition.

* * * * *